United States Patent
Coburn

(10) Patent No.: US 9,296,477 B1
(45) Date of Patent: Mar. 29, 2016

(54) MULTI-ROTOR HELICOPTER

(71) Applicant: Glenn Coburn, Temecula, CA (US)

(72) Inventor: Glenn Coburn, Temecula, CA (US)

(*) Notice: Subject to any disclaimer, the term of this patent is extended or adjusted under 35 U.S.C. 154(b) by 76 days.

(21) Appl. No.: 14/121,022

(22) Filed: Jul. 21, 2014

(51) Int. Cl.
| | | |
|---|---|---|
| *B64C 27/08* | (2006.01) | |
| *B64C 27/46* | (2006.01) | |
| *B64C 27/14* | (2006.01) | |
| *B64C 1/00* | (2006.01) | |
| *B64D 35/00* | (2006.01) | |
| *B64C 27/54* | (2006.01) | |
| *B64C 39/10* | (2006.01) | |

(52) U.S. Cl.
CPC .............. *B64C 27/08* (2013.01); *B64C 1/0009* (2013.01); *B64C 27/14* (2013.01); *B64C 27/46* (2013.01); *B64C 27/54* (2013.01); *B64D 35/00* (2013.01); *B64C 2001/0045* (2013.01); *B64C 2039/105* (2013.01)

(58) Field of Classification Search
CPC ........ B64C 27/08; B64C 27/46; B64C 27/14; B64C 1/0009; B64C 27/54; B64C 2001/0045; B64C 2039/105; B64D 35/00
See application file for complete search history.

(56) References Cited

U.S. PATENT DOCUMENTS

| | | | |
|---|---|---|---|
| 1,573,228 A | 6/1923 | Debothezat | |
| 1,749,471 A | 3/1924 | Debothezat | |
| 2,540,404 A | 4/1949 | Neale | |
| 2,973,924 A | 11/1956 | Marriage | |
| 6,286,783 B1 * | 9/2001 | Kuenkler | B63H 5/125 244/26 |
| 7,264,199 B2 | 9/2007 | Zientek | |
| 8,052,081 B2 * | 11/2011 | Olm | B64C 1/30 244/17.23 |
| 8,292,215 B2 * | 10/2012 | Olm | B64C 1/30 244/17.23 |
| 8,322,648 B2 * | 12/2012 | Kroetsch | A63H 27/12 244/17.23 |
| 8,485,464 B2 | 7/2013 | Kroo | |
| 8,636,473 B2 | 1/2014 | Brunken, Jr. | |
| 8,640,983 B2 | 2/2014 | Brunken, Jr. | |
| 8,640,985 B2 | 2/2014 | Brunken, Jr. | |
| 2004/0245374 A1 | 12/2004 | Morgan | |
| 2009/0008499 A1 * | 1/2009 | Shaw | B64C 27/20 244/17.23 |
| 2010/0243794 A1 * | 9/2010 | Jermyn | A63H 27/12 244/17.23 |
| 2011/0226892 A1 | 9/2011 | Crowther et al. | |
| 2012/0298793 A1 * | 11/2012 | Weddendorf | F03D 1/02 244/17.23 |
| 2014/0131510 A1 * | 5/2014 | Wang | B64C 39/024 244/17.23 |
| 2014/0138477 A1 | 5/2014 | KEENNON | |

FOREIGN PATENT DOCUMENTS

RU          2500577          12/2013

* cited by examiner

*Primary Examiner* — Valentina Xavier

(57) ABSTRACT

A helicopter system has multiple rotors and methods of operation. The helicopter has a fuselage with four rotors and an engine operably connected to the four rotors for powered rotation of a rotor shaft with a set of rotor blades attached for each of the four rotors. Each of the rotor shafts is positioned in a housing with each housing attached at a lower end to a distal end of a beam with beams attached at a proximal end on the right side and on the left side adjacent to the nose end of the fuselage, and on the right side and on the left side adjacent to the tail end of the fuselage. All four rotor shafts are inclined from a lower end to an upper end toward the fuselage. All four rotor shafts may be inclined toward the nose end or the tail end of the fuselage.

18 Claims, 3 Drawing Sheets

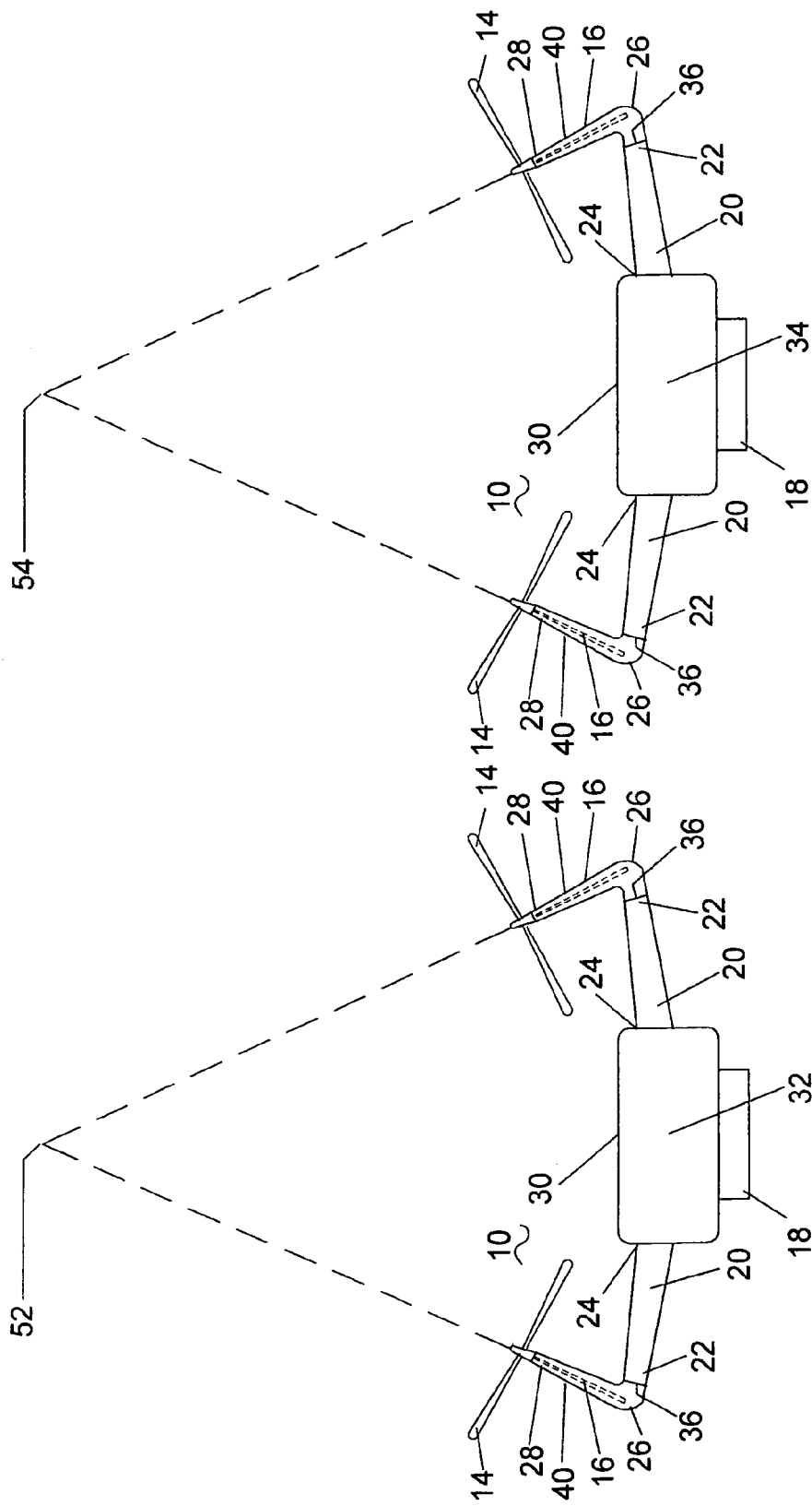

MULTI-ROTOR HELICOPTER

BACKGROUND OF THE INVENTION

This invention relates to multi-rotor helicopter systems and methods of operation. The new multi-rotor helicopter allows lift and horizontal motion for three dimensional spatial movement controlled with rotor blade pitch angle and rotor shaft rotational orientation of each rotor. The spatial movement can be performed at generally constant rotor blade rotational speed.

Helicopters that have four sets of variable pitch rotor blades may be known. Also, tilt rotor aircraft with separate engines at the ends of aircraft wing tips that allow rotating an engine and propeller from a horizontal orientation to a vertical orientation are known. Some simple helicopters and drone aircraft may use only speed of rotor blades as the controls for lift and horizontal motion control. Where change of pitch of rotor blades may be used for lift and direction control, general methods of use may include a cyclic pitch change, a swash plate apparatus, or a hinged blade system. Use of more than one set of rotor blades on each rotor shaft of a multi-rotor aircraft/helicopter may also be known for use to increase lift and/or thrust of a rotorcraft.

SUMMARY OF THE INVENTION

The present invention is directed to helicopter systems with multiple rotors and methods of operation. The helicopter has a fuselage with four rotors carried by the fuselage and an engine operably connected to the four rotors for powered rotation of a rotor shaft with a set of rotor blades attached for each of said four rotors. Each of the rotor shafts is positioned in a housing with each housing rotatably attached at a lower end to a distal end of a beam. A first beam of the beams is attached at a proximal end adjacent to the nose end on the right side of the fuselage, a second beam is attached adjacent to the nose end on the left side of the fuselage, a third beam is attached adjacent to the tail end on the right side of the fuselage, and a fourth beam is attached adjacent to the tail end on the left side of the fuselage.

These and other features, aspects and advantages of the present invention will become better understood with reference to the following drawings, description and claims.

BRIEF DESCRIPTION OF THE DRAWINGS

FIG. 2 illustrates a stylized schematic front view of a multi-rotor helicopter according to an embodiment of the invention;

FIG. 3 illustrates a stylized schematic rear view of a multi-rotor helicopter according to an embodiment of the invention;

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
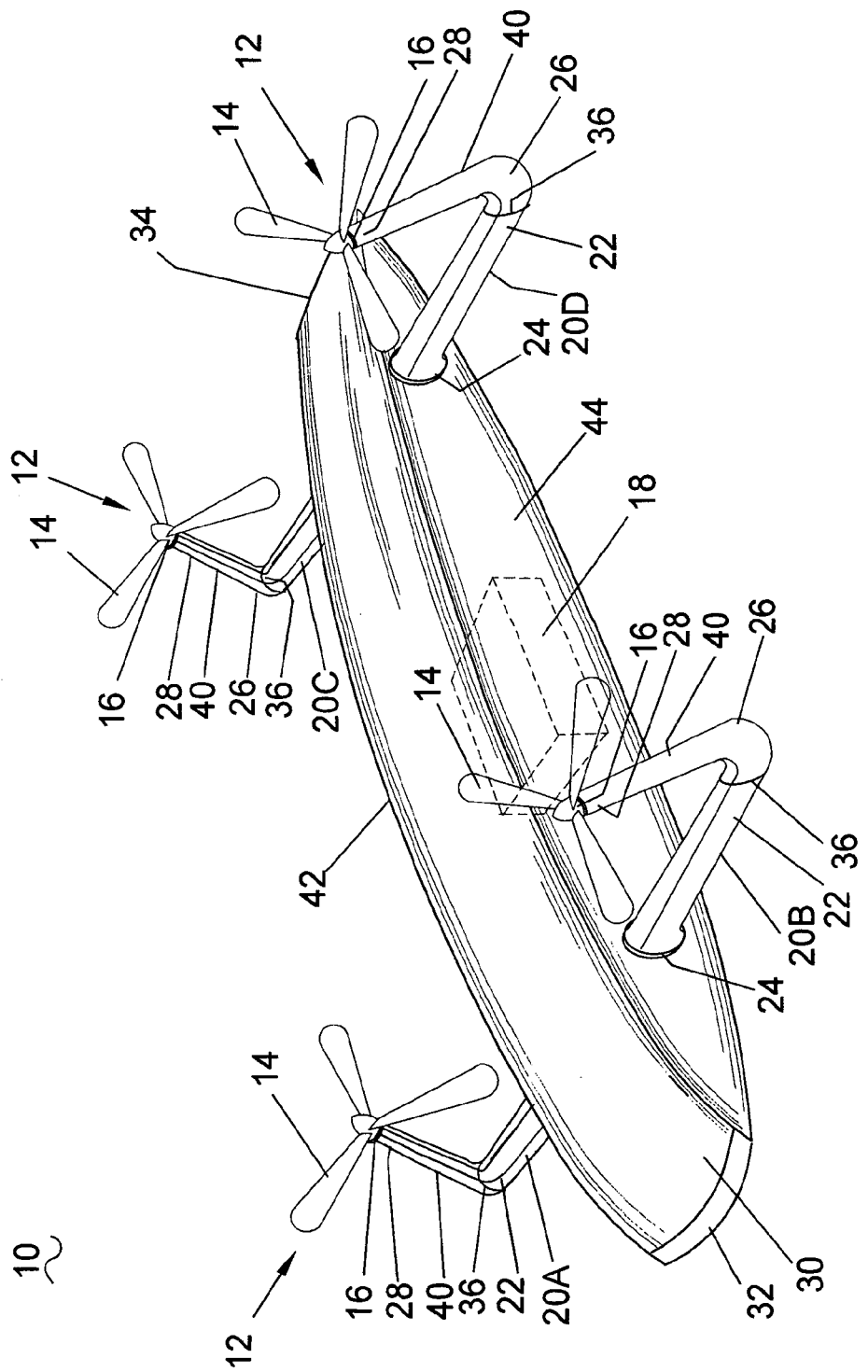
FIG. 1 illustrates a perspective view of a multi-rotor helicopter according to an embodiment of the invention.

Referring to FIG. 1, a helicopter 10 has four rotors 12 each with a set of rotor blades 14 on a rotor shaft 16 with each rotor 12 attached to a beam 20 or arm at a distal end 22. Each beam 20 is attached at a proximal end 24 to a fuselage 30 of the helicopter 10. The beams 20 are attached to the fuselage 30 spaced apart with two opposed beams 20 A and 20 B positioned adjacent to the nose end 32 of the fuselage 30 and two opposed beams 20 C and 20 D positioned adjacent to the tail end 34 of the fuselage 30.

The rotor shafts 16 are enclosed in housings 40 that may be rotatably attached to a pivot joint 36 at the distal ends 22 of the beams 20 to allow two dimensional rotation about the longitudinal axis of the beams 20. This allows the rotor shafts 16 to be generally vertical, or to be slanted forward toward the nose end 32 or rearward toward the tail end 34 of the fuselage 30. The housings 40 may also be fixedly attached to the beams 20 at the distal ends 22 and the proximal ends 24 may be rotatably attached to the fuselage 30. This allows rotation of the structure of the beams 20 and housings 40 to position the rotor shafts 16 to be slanted forward toward the nose end 32, to be generally vertical, and to be slanted rearward toward the tail end 34.

The rotors 12 are linked to an engine 18 that may be positioned below the center of gravity of the fuselage 30 and may be attached interior to the fuselage 30 or partially exterior to the lower airframe with enclosure in a nacelle. This positioning may allow for improved stability of the helicopter 10. A linkage system from the rotor shafts 16 through the beams 20 and fuselage 30 is operatively connected to the engine 18 and a helicopter operator control system (not shown). The rotors 12 may each have a set of rotor blades 14 and each set of rotor blades 14 may have two or more rotor blades 14 wherein the blades 14 in each set are synchronized for pitch angular position.

The beams 20 are attached to the fuselage 30 and shaped such that the rotor blades 14 are at a height above the center of the fuselage 30 body and the rotor shafts 16 when viewed from the nose end 32 are offset from the fuselage 30 body to minimize downward thrust onto the fuselage 30. Also, when viewed from the nose end 32 the rotor shafts 16 are located symmetrically to the fuselage 30, and the rotor shafts 16 are inclined toward the fuselage 30 from their lower end 26 to their upper end 28 such that the two nose end 32 rotor shafts 16 are inclined toward a common vertex 52 and two tail end 34 rotor shafts 16 are inclined toward a common vertex 54 over the fuselage 30. Further, when the rotor shafts 16 and fuselage 30 are viewed from the side the rotor shafts 16 may be inclined toward the center and over the fuselage 30 body toward a common vertex 50 as illustrated in FIG. 5.

Referring to FIGS. 2 through 5, during operation of the helicopter 10 for vertical lift or decent the rotors 12 may be inclined with the front two rotor shafts 16 slanted toward the tail end 34 and the rear two rotor shafts 16 slanted toward the nose end 32 for improved stability and reduced vibration. Also, common rotor blade 14 pitch during rotor blade 14 rotation contributes to reduced vibration. The rotors 12 may all be operated to rotate at similar speed with the two rotors 12 on the right side of the fuselage 30 rotating counterclockwise and the two rotors 12 on the left side rotating clockwise as viewed in top view FIG. 4 to balance the torque effects of the four rotor 12 operation. The rotors 12 direction of rotation may be interchanged so long as each side of the fuselage is in an opposite direction for the two rotors 12. The thrust of the rotors 12 can be varied by varying the pitch of the rotor blades 14 for acceleration, deceleration of motion of the helicopter 10. The angle of attack of all rotor blades 14 on any one rotor shaft 16 are synchronized so that the pitch is similar for all blades on the rotor shaft 16. The angle of attack of rotor blades 14 on any one rotor shaft 16 may be controlled separately of each of the other rotor shaft 16 rotor blades 14 angles of attack.

Figures 4, 5:
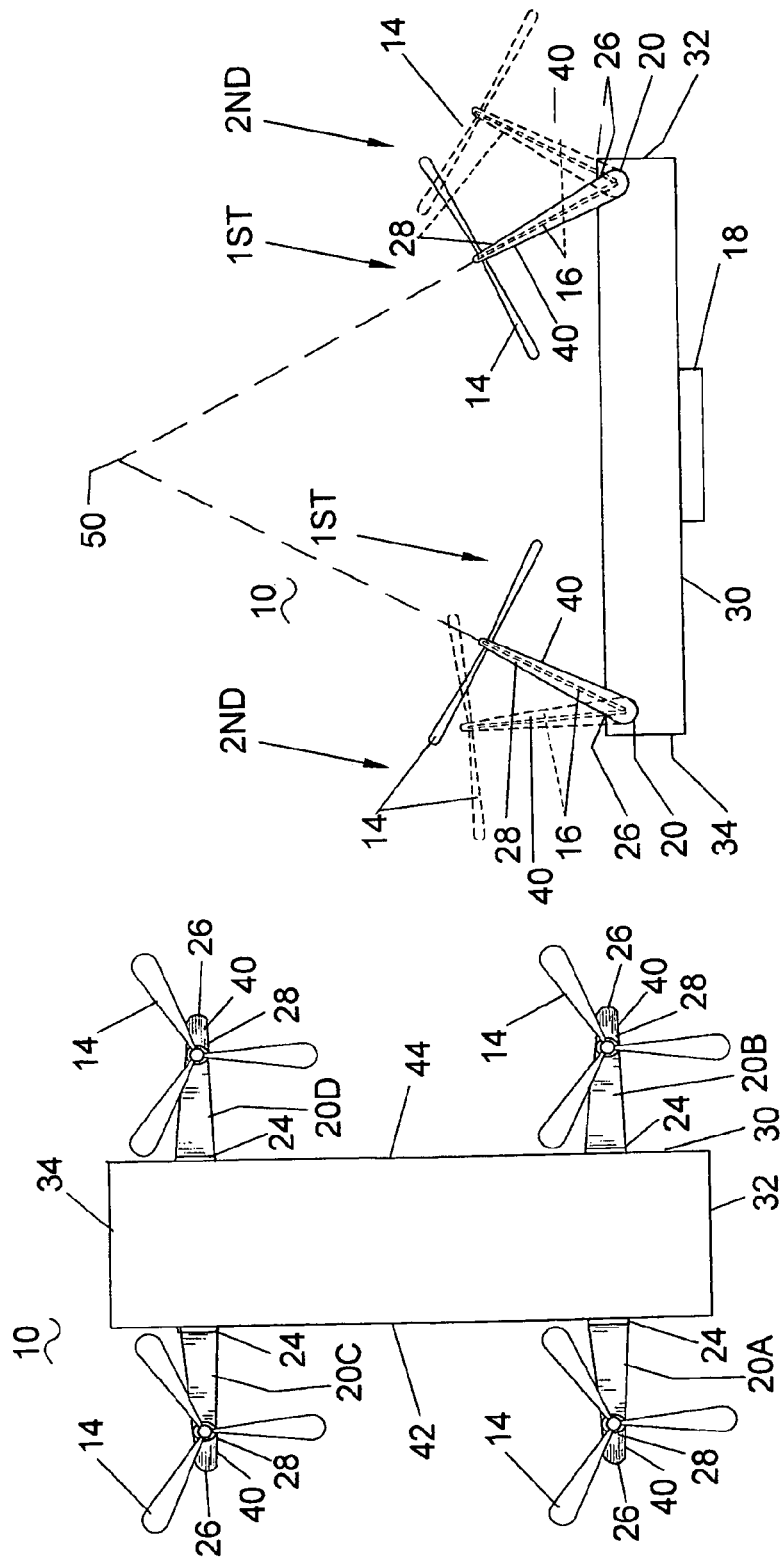
FIG. 4 illustrates a stylized schematic top view of a multi-rotor helicopter according to an embodiment of the invention.
FIG. 5 illustrates a stylized schematic left side elevation view of a multi-rotor helicopter according to an embodiment of the invention.

Referring to FIG. 5, the two nose end 32 rotor shafts 16 may be rotated from an inwardly or rearwardly inclined orientation to an outwardly or forwardly inclined orientation for increased speed of forward movement of the helicopter 10. The two tail end 34 rotor shafts 16 may be rotated from an inwardly or forwardly inclined orientation to a more vertically oriented position as the two nose end 32 rotor shafts 16 are reoriented in order to maintain the helicopter stability during directional motion changes of the helicopter 10. For efficient forward travel of the helicopter 10 the four rotor shafts 16 may be inclined toward the nose end 32 with the rotor shafts 16 inclined general parallel to one another in the forward travel direction.

The fuselage 30 body shape may be any suitable form depending on the intended use, for example, for an unmanned vehicle such as a drone or toy vehicle of small size the shape may be a general structural form. For a helicopter 10 that may be intended for long duration time flights the fuselage 30 may have the general shape of an airfoil as illustrated in FIG. 1. The pitch control for rotor blades may be angular rotation at the rotor blade 14 blade roots similar to current conventional helicopter tail rotor blades. Variation of the pitch of a set of rotor blades on any one or more of the rotor shafts may be used to change horizontal or vertical motion of the helicopter for spatial movement to change direction or to maneuver for environmental conditions such as wind and other factors.

While the invention has been particularly shown and described with respect to the illustrated embodiments thereof, it will be understood by those skilled in the art that the foregoing and other changes in form and details may be made therein without departing from the spirit and scope of the invention.

I claim:

1. A helicopter, comprising:
a fuselage with four rotors carried by the fuselage and an engine operably connected to said four rotors for powered rotation of a rotor shaft with at least one set of rotor blades attached for each of said four rotors;
each of said rotor shafts disposed in a housing with each housing attached at a lower end to a distal end of a beam;
wherein a first beam of said beams is attached at a proximal end adjacent a nose end on a right side of said fuselage, a second beam of said beam is attached at a proximal end adjacent said nose end on a left side of said fuselage, a third beam of said beams is attached at a proximal end adjacent a tail end on said right side of said fuselage, and a fourth beam of said beams is attached at a proximal end adjacent said tail end on said left side of said fuselage; and
wherein each of said first beam, said second beam, said third beam, and said fourth beam is rotatably attached at said proximal ends adjacent said fuselage.

2. The helicopter as in claim 1 wherein each set of rotor blades has at least two rotor blades.

3. The helicopter as in claim 1 wherein each of said first beam, said second beam, said third beam, and said fourth beam is fixedly attached at said distal ends, and each of said housings is rotatably attached to said distal ends.

4. The helicopter as in claim 1 wherein said engine is disposed below the center of gravity of said fuselage.

5. The helicopter as in claim 1 wherein said beams are attached to said fuselage to position said sets of rotor blades above said fuselage.

6. The helicopter as in claim 2 wherein said beams are of sufficient length to position said four rotors offset from said fuselage body the length of a rotor blade.

7. The helicopter as in claim 1 wherein each of said rotor shafts are inclined toward said fuselage from said lower end to said upper end:
to dispose said rotors at said nose end to be inclined toward a first common vertex over said fuselage; and
to dispose said rotors at said tail end to be inclined toward a second common vertex over said fuselage.

8. The helicopter as in claim 1 wherein said rotors at said nose end are rotatable from a first position with said rotor shafts inclined toward said tail end to a second position with said rotor shafts inclined forward toward said nose end of said fuselage.

9. The helicopter as in claim 1 wherein said rotors at said tail end are rotatable from a first position with said rotor shafts inclined toward said nose end to a second position with said rotor shafts inclined rearward toward said tail end of said fuselage.

10. The helicopter as in claim 1 wherein said rotors positioned on said right side of said fuselage are rotated counterclockwise and said rotors positioned on said left side of said fuselage are rotated clockwise.

11. The helicopter as in claim 1 wherein said rotors positioned on said right side of said fuselage are rotated clockwise and said rotors positioned on said left side of said fuselage are rotated counterclockwise.

12. The helicopter as in claim 2 wherein each of said sets of rotor blades is attached to each of said rotor shafts at a rotatable joint for rotation about the longitudinal axis of said rotor blades.

13. The helicopter as in claim 12 wherein:
an angle of attack of sets of rotor blades is separately controlled for each of said rotor shafts; and
each of said rotor blades of each of said sets of rotor blades has a same angle of attack.

14. The helicopter as in claim 1 wherein the general form of said fuselage is shaped as an airfoil.

15. A method for control of the helicopter of claim 1, comprising:
inclining the rotors at the tail end toward the front end for a first position and the rotors at the nose end toward the tail end for a first position, and operating the rotors at a similar rotating speed for vertical lift and decent;
varying the sets of rotor blade pitch of one or more of the rotors to change the orientation of the helicopter or to maneuver for environmental conditions;
rotating the rotors at the nose end from the first position toward a second position inclined toward the nose end while rotating the rotors at the tail end from the first position toward a second position inclined toward the tail end; and
rotating further the rotors at the tail end to return to the first position inclined toward the nose end for increased forward velocity travel.

16. The method as in claim 15 wherein the rotor shafts of rotors at the nose end and the rotor shafts of the rotors at the tail end are inclined approximately parallel when inclined toward the nose end.

17. A method for control of the helicopter of claim 7, comprising:
inclining the rotors at the tail end toward the front end for a first position and the rotors at the nose end toward the tail end for a first position, and operating the rotors at a similar rotating speed for vertical lift and decent;

varying the sets of rotor blade pitch of one or more of the rotors to change the orientation of the helicopter or to maneuver for environmental conditions;

rotating the rotors at the nose end from the first position toward a second position inclined toward the nose end while rotating the rotors at the tail end from the first position toward a second position inclined toward the tail end; and rotating further the rotors at the tail end to return to the first position inclined toward the nose end for increased forward velocity travel.

18. The method as in claim 17 wherein the rotor shafts of rotors at the nose end and the rotor shafts of the rotors at the tail end are inclined approximately parallel when inclined toward the nose end.

\* \* \* \* \*